US011035042B2

(12) United States Patent
Wagner et al.

(10) Patent No.: US 11,035,042 B2
(45) Date of Patent: Jun. 15, 2021

(54) METHOD AND DEVICE FOR MARKING AT LEAST ONE INNER FACE OF A CONTAINER, AND CORRESPONDING CONTAINER

(71) Applicant: Glass Surface Technology, Paris (FR)

(72) Inventors: Christophe Wagner, Bussiere-Poitevine (FR); Antoine Bauvin, Limoges (FR)

(73) Assignee: Glass Surface Technology, Paris (FR)

(*) Notice: Subject to any disclaimer, the term of this patent is extended or adjusted under 35 U.S.C. 154(b) by 0 days.

(21) Appl. No.: 16/302,757

(22) PCT Filed: May 24, 2017

(86) PCT No.: PCT/FR2017/051311
§ 371 (c)(1),
(2) Date: Nov. 19, 2018

(87) PCT Pub. No.: WO2017/203183
PCT Pub. Date: Nov. 30, 2017

(65) Prior Publication Data
US 2019/0301021 A1    Oct. 3, 2019

(30) Foreign Application Priority Data
May 26, 2016    (FR) ...................................... 1654718

(51) Int. Cl.
*C23C 18/12*    (2006.01)
*C23C 18/06*    (2006.01)
(Continued)

(52) U.S. Cl.
CPC ...... *C23C 18/1254* (2013.01); *B23K 26/0006* (2013.01); *B23K 26/0622* (2015.10);
(Continued)

(58) Field of Classification Search
CPC ............ C23C 18/1254; C23C 18/1295; C23C 18/122; C23C 18/16; C23C 18/127;
(Continued)

(56) References Cited

U.S. PATENT DOCUMENTS

2011/0039038 A1*    2/2011    Ronsin ................... A45D 34/02
427/596

FOREIGN PATENT DOCUMENTS

FR          2939615 A1    6/2010
WO    WO-2004080613 A1 *    9/2004    ............. B44C 3/005
(Continued)

OTHER PUBLICATIONS

Sep. 20, 2017, International Search Report of PCT/FR2017/051311.
(Continued)

*Primary Examiner* — Dah-Wei D. Yuan
*Assistant Examiner* — Nga Leung V Law
(74) *Attorney, Agent, or Firm* — Banner & Witcoff, Ltd.

(57)    ABSTRACT

The present inventing relates to a method for marking at least one inner face of a container with at least one given pattern, in which method the inside of said inner face is at least partially coated with a pigmented sol-gel layer that reacts to laser radiation, by spraying or by means of a stamp applied to a precise zone of the layer provided for containing the pattern, and the pattern is developed by interaction between the sol-gel and UV laser radiation specifically programmed according to the pattern to be revealed, the UV laser radiation being emitted by a device comprising an optical system having a long optical length that allows a field depth of more than 1 mm to be obtained. The present invention also relates to a device suitable for implementing this method and to a container obtained by this method.

14 Claims, 10 Drawing Sheets

(51) Int. Cl.
　　　B05D 3/06　　　(2006.01)
　　　B05D 7/22　　　(2006.01)
　　　B05D 5/06　　　(2006.01)
　　　B23K 26/0622　(2014.01)
　　　B23K 26/352　 (2014.01)
　　　B65D 23/02　　(2006.01)
　　　C03C 17/00　　(2006.01)
　　　B23K 26/70　　(2014.01)
　　　B23K 26/10　　(2006.01)
　　　B23K 26/08　　(2014.01)
　　　B23K 26/00　　(2014.01)
　　　B23K 26/12　　(2014.01)
　　　B44C 1/22　　 (2006.01)

(52) U.S. Cl.
　　　CPC ...... *B23K 26/0823* (2013.01); *B23K 26/0869* (2013.01); *B23K 26/103* (2013.01); *B23K 26/127* (2013.01); *B23K 26/352* (2015.10); *B23K 26/702* (2015.10); *B65D 23/02* (2013.01); *C03C 17/004* (2013.01); *C23C 18/06* (2013.01); *C23C 18/122* (2013.01); *C23C 18/127* (2013.01); *C23C 18/1212* (2013.01); *C23C 18/1295* (2013.01); *B05D 3/067* (2013.01); *B05D 5/06* (2013.01); *B05D 7/227* (2013.01); *B05D 2203/35* (2013.01); *B44C 1/228* (2013.01); *C03C 2217/72* (2013.01); *C03C 2218/113* (2013.01); *C03C 2218/32* (2013.01)

(58) Field of Classification Search
　　　CPC ... C23C 18/06; C23C 18/1212; B23K 26/702; B23K 26/103; B23K 26/0869; B23K 26/0006; B23K 26/127; B23K 26/0823; B23K 26/0622; B23K 26/352; B65D 23/02; C03C 17/004; C03C 2217/72; C03C 2218/32; C03C 2218/113; B05D 3/067; B05D 7/227; B05D 5/06; B05D 2203/35; B44C 1/228
　　　See application file for complete search history.

(56) References Cited

FOREIGN PATENT DOCUMENTS

| WO | 2010/084291 | A1 | | 7/2010 | |
| WO | WO-2010084291 | A1 | * | 7/2010 | ......... C03C 23/0025 |
| WO | 2011/131911 | A1 | | 10/2011 | |
| WO | WO-2015197323 | A1 | * | 12/2015 | ........... A23G 3/0097 |

OTHER PUBLICATIONS

Machine-generated translation of claims of WO2004080613A1 downloaded from European Patent Office, Sep. 23, 2004.
Machine-generated translation of claims of WO2010084291 A1 downloaded from European Patent Office, Jul. 29, 2010.

* cited by examiner

Fig.4 (photo 1)

Fig.4A

Fig.5 (photo 2)

Fig.6 (photo 3)

Fig.7 (photo 4)

Fig.8 (photo 5)

Fig.9 (photo 6)

Fig.10 (photo 7)

Fig.11 (photo 8)

Fig.12 (photo 9)

Fig.13 (photo 10)

Fig.14 (photo 11)

Fig.15 (photo 12 or 13)

Fig.15'
(photo 14)

Fig. 16

METHOD AND DEVICE FOR MARKING AT LEAST ONE INNER FACE OF A CONTAINER, AND CORRESPONDING CONTAINER

The present invention relates to a process for marking at least one inner face of a container equipped with a bottom and an opening (jar, bottle, etc.), in which at least one portion of the inner face is covered internally with a sol-gel coating.

The invention also relates to a process for the simultaneous marking of several faces of the container.

It also relates to a device that implements such a marking process, and also to a container marked on at least one internal portion of at least one of its walls.

A marking process is understood to mean a process that makes it possible to reveal, in a manner visible to the human eye, a sign, design, character, symbol or any graphic form, which is colored or colorless, in 3D or substantially flat on the wall of the container, for example glass container.

A sol-gel coating is understood to mean a surface layer of material obtained by solidifying a sol-gel mixture on the surface of an object formed of another material, in an integral and long-lasting manner, that is to say for durations of greater than several years. Such a coating then modifies the physical and/or chemical surface properties of this other material.

The invention finds a particularly important but not exclusive application in the field of manufacturing and marking bottles or jars intended to receive and preserve agri-food, pharmaceutical, cosmetic or perfumery products, one inner face of which has been coated with a pigmented sol-gel layer.

The external marking of the wall of a container, for example by coloring, is known.

However, this external marking has drawbacks. Specifically, it risks being sensitive to external bumps and scratches which ultimately degrades the esthetic quality required in particular in the perfumery field.

It is also known to apply a sol-gel coating to the inner face of a bottle. In this case, the contents however come into direct contact with the inner coating, which has drawbacks for reasons of extraction and/or release of components into the contents (pharmaceutical liquid, perfumes, etc.) which could deteriorate them or even render them dangerous.

By applying a layer to the inside of the container, potentially harmful elements are in fact directly introduced into the bottle.

Thus, a process is known (WO 2010/061150) for marking the inner face of a hollow body made of metallized glass, but which may contaminate the contents.

Furthermore, in the case where only a portion of the surface is coated, a border or stoppage of the coating is introduced, which is conducive to the preferential detachment between covered zones and non-covered zones.

The inner layer is furthermore not very accessible.

Carrying out the marking by application of an inner coating therefore has drawbacks.

The application of an inner coating is also conventionally carried out by spraying or by stamping, which leads to risks of smudges, overthicknesses and lack of precision which are all a hindrance for esthetic marking.

A process is also known (US 2011/0039038) for decorating a perfume bottle by use of a laser of YAG laser type for treating a coating layer.

But besides the fact that these layers require a very fine focusing, they interact with materials such as glass, which limits their field of use, and they risk generating unacceptable subsequent releases from the wall of the container into the product which is contained therein. The present invention makes it possible to overcome these drawbacks by making it possible in particular to respond better than the processes previously known to the requirements of the art, especially in that it allows an internal marking of high precision while minimizing the container-contents interactions and/or certain environment-contents interactions, this being more particularly for storage in glass bottles, requiring preservation of products in an inert manner for a relatively long time (for example several months).

Greater precision is understood to mean values determined to ±100 nm in thickness for a layer and/or in length for a pattern for example made of a thin layer.

With the invention, it will be possible to produce a precise internal pattern or lettering, in one color or in several colors (multicolor).

Furthermore, and for example, in a parallelepipedal bottle, the four inner/outer surfaces of two opposite walls can be marked simultaneously and/or successively, in particular to make 3D patterns or deep patterns.

In order to do this, the present invention proposes in particular a process for marking at least one inner face of a container with at least one predetermined pattern, wherein said inner face is internally covered, at least in part, with a pigmented sol-gel layer that reacts to laser radiation, by spraying or stamping said layer on a precise predetermined zone arranged to contain the pattern and the pattern is developed by interaction between the sol gel and UV laser radiation specifically programmed as a function of the pattern to be revealed.

Although the invention makes it possible to create and/or to a posteriori correct a pattern, it is particularly advantageous on a layer or a pattern that is substantially homogeneous and/or of substantially uniform thickness.

Thus, any gain in terms of application of the layer or of the pattern is not only an esthetic gain but also a gain in terms of risk of future releases from the wall or from the layer into the contained product.

Advantageously, the laser comprises an optic with a long focal distance which allows a depth of field of greater than one or more millimeters, for example greater than 1 mm, for example greater than 3 mm, for example greater than 5 mm.

Depth of field is understood to mean the axial distance perpendicular to the plane of the optic (that is to say along the focusing axis) including the focal plane of the laser in a centered manner relative to said focal plane and inside which the laser beam retains substantially identical properties, especially energy properties.

In one advantageous embodiment, the invention proposes a process for treating at least one inner face of a container, wherein said inner face is internally covered, at least in part, with a sol-gel layer, and said layer is treated by laser radiation, characterized in that, said layer being a pigmented layer that reacts to laser radiation, the sol-gel layer is applied by spraying or stamping said layer on a precise predetermined zone arranged to contain a pattern and the pattern is developed by interaction between the sol gel and UV laser radiation is emitted by a device comprising an optic with a long focal distance allowing a depth of field of greater than 1 mm, and is programmed specifically as a function of said pattern to be revealed.

Advantageously, the depth of field is greater than 1.2 mm, for example greater than 1.5 mm, for example of the order of 3 mm (±10%).

In one advantageous embodiment, the UV laser radiation is focused (i.e. the focal plane is placed) at an adjustable predetermined distance, for example a nonzero distance, from the inner face to be marked.

It is thus possible to preferentially mark a surface placed closer to the focal plane while having a controlled impact simultaneously on another surface.

Advantageously, use is made of a UV laser having a wavelength of between 255 and 400 nm, for example of 355 nm and having a power of between 2 W and 5 W, for example 3 W.

It is then observed, in combination with the other features of the invention, that these UV photon wavelengths directly break the impacted atomic bonds without heating and damaging the material around, which makes it possible to control the precision and the impact on the material of the container.

Also advantageously, the laser uses a flat-field lens (i.e. which corrects the field curvature), which makes it possible to move the focal point over a plane. In this embodiment, the focal distance is for example 210 mm.

By moving the bottle, in a relative manner, with respect to this distance and by adjusting the parameters of the laser, the surface or surfaces of the bottle to be marked and also the type of marking (removal of a portion of the coating material and/or marking of the coating itself) are thus chosen.

The main adjustment parameters are taken from the positioning of the focal point or plane with respect to the wall(s) to be marked, the frequency, the % of the maximum power of the laser used, the chosen sweep rate of the radiation and the optical resolution (depth of field) selected.

In advantageous embodiments, recourse is made, furthermore and/or in addition, to one and/or the other of the following arrangements:

the covering layer is applied by spraying, by means of a nozzle vibrating and/or oscillating about a displacement direction of the nozzle in the bottle;

at least two spots of different colors are applied, which are arranged to enable the creation of a pattern having at least two colors.

It is thus possible to superimpose and/or juxtapose layers of different colors and to produce a pattern which may or may not be a single pattern, optionally in one piece. It is for example possible to produce a dragon pattern for example that is at least two-colored;

the predetermined distance locates the focal plane on a coated inner face;

the predetermined distance locates the focal plane above or below the coated inner face;

several marking patterns are superimposed on one another, on one and the same face, including a first pattern.

The stack of layers enables sets of different colors and possibilities of revealing, according to the laser action, one or more layers simultaneously by contrast with the last layer;

the superimposing is carried out by at least one repetition of a step of applying a colored layer and of a step of engraving a pattern in said colored layer.

Engraving is understood in particular here to mean the action of the laser on at least one layer so as to detach and/or evaporate and/or remove a portion of said layer over a given thickness for example greater than the thickness of the layer so as to reveal the lower layer or the underlying glass.

The superimposing means, for example, a stacking, in the thickness direction of the glass, of at least one portion of the at least two superimposed layers;

each marking pattern is located in the laser field by one and the same geometric reference marked during the marking of the first pattern;

the pigment of the sol-gel layer imparting thereto a specific initial coloration, the laser radiation is focused around the surface of the inner face at a predetermined distance arranged in order to remove a portion of said layer so as to reveal said pattern;

the laser radiation is focused around the inner face at a predetermined distance in order to cure and fix the sol gel at the location and according to the desired pattern (s), and the uncured excess around the pattern(s) is removed;

the laser is located outside of the container which rotates and/or is moved horizontally and/or vertically in connection with the latter to expose the bottle portions intended to exhibit said pattern;

the radiation is controlled continuously and/or discontinuously in order to optionally reveal the elements of the pattern;

several walls of the container are marked simultaneously with one and the same UV radiation;

at least two walls of the container are marked simultaneously, at least one of the walls of which is marked by etching of the glass and at least one other wall of which is marked by interaction between the sol-gel layer and the UV laser radiation so as to give the pattern a three-dimensional effect.

It is thus possible, with one and the same excitation/pulse of the laser, i.e. in a single operation, to interact with the same radiation on at least two walls over the path traveled by said radiation.

With the invention, it is therefore in particular possible to carry out for example an operation for engraving one wall and an operation for localized color change of a sol-gel layer on an opposite wall so that the visual superimposition of the respective patterns of the walls, and the optional controlled offsets thereof, result in an impression of relief or of three-dimensional patterns.

Advantageously, the sol gel used is formed from alkoxysilane and/or organosilane precursors, from ethanol and/or butoxyethanol solvent, from surfactants, from citric acid and from additives and/or pigments and/or colorant with no, or not comprising a significant amount of, compounds that reflect the UV rays of the laser.

The invention also proposes a device that implements the process as described above.

It also proposes a marking device comprising a support tool for a bottle, means for rotating the bottle, and UV laser means external to the bottle, arranged in order to direct a UV laser beam in a programmed manner in order to reveal a pattern on the inner face of the bottle precoated with a pigmented sol-gel product.

Advantageously, the UV laser means comprise an optic with a long focal distance allowing a depth of field of greater than 1 mm.

The expression "greater than 1 mm" is understood to mean greater than 1 mm±20% (of 1 mm), for example±10% or ±5%.

The invention also proposes a container or bottle obtained by the process described above.

It also relates to a container, made of glass or plastic, having at least one inner face comprising a sol-gel inner coating marked by a pattern according to the process described above.

With the process according to the invention, the containers obtained not only have a more attractive marking but furthermore improved properties of their inner surface.

Specifically, it is possible to produce, by the coating layer that remains around the marking and/or that of the marking, a thermal barrier function in addition to its resistance to release.

The invention will be better understood on reading the following description of embodiments given below as non-limiting examples.

It is carried out with reference to the figures which accompany it, in which:

FIGS. 4 and 4A to 15 and 15' show embodiments (photographs 1 to 14) of containers marked according to the invention.

Figure 1A:
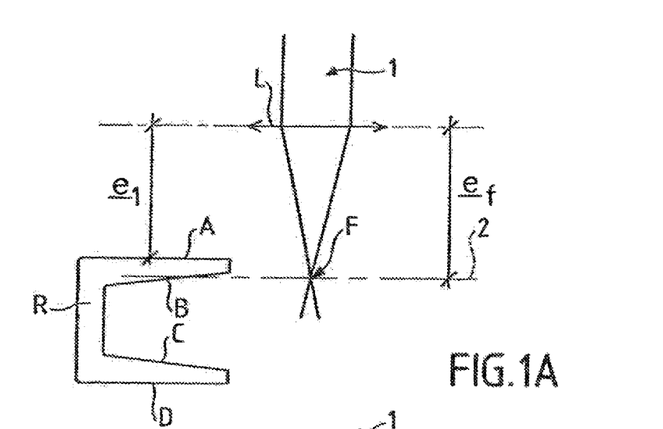
FIGS. 1A, 1B and 1C schematically show the position of the focal plane of the laser relative to the container in order to produce several markings according to the process of the invention more particularly described here.
Figure 1B:
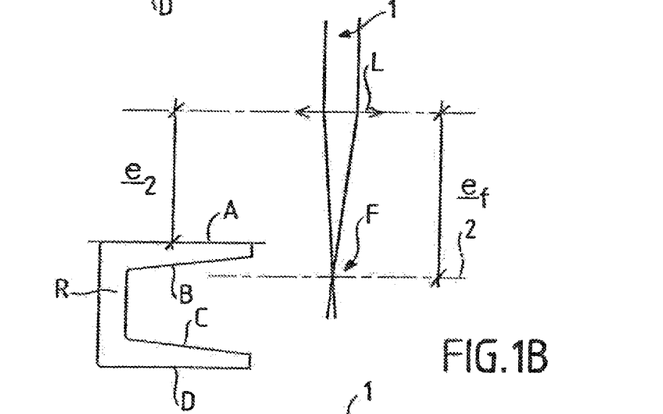
Figure 1C:
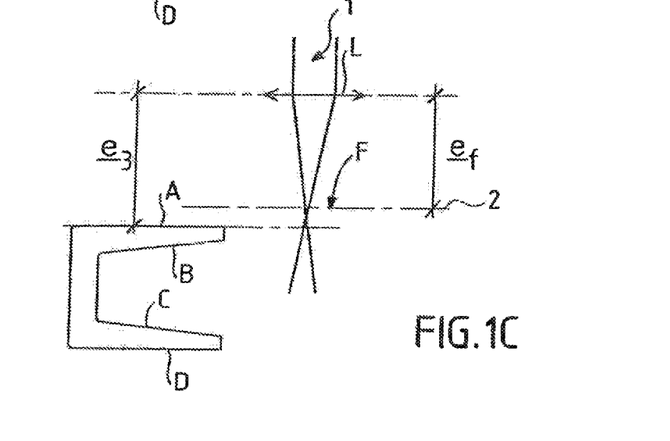

FIGS. 1A, 1B and 1C show a parallelepipedal bottle or container R, for example made of glass, represented schematically in cross section, laid on the side, and which comprises side wall faces that are parallel or substantially parallel, namely an upper outer face A, an upper inner face B, a lower inner face C and a lower outer face D.

Represented on the right of the figures, and in an offset manner for better understanding of the diagram, is the UV laser beam 1, focused by a lens L, its focal point F lying in the focal plane 2.

In FIG. 1A, the bottle F is positioned so that the distance of between the lens and the focal plane and the distance $e_1$ between the upper outer face A of the bottle places the focal plane 2 substantially on the inner face B of the bottle.

Such an arrangement enables the formation of a logo by removal of the sol gel on the surface B previously covered with sol gel (low energy, with the focal plane in the sol gel). The adjustment of the energy and of the frequency of the laser is then carried out in a manner within the means of a person skilled in the art to enable the removal and/or the curing of the sol gel without catching the surface and this being as a function of the internal geometry of the bottle.

In this embodiment, the adjustment of the focal plane may be at 210 mm from the lens, for a distance $e_1$ of 207 mm (wall thickness of the bottle roughly 3 mm).

FIG. 1B shows an adjustment of the focal plane with respect to the bottle inside of the bottle, for example a distance $e_2$ of 202 mm, still for a focal distance of 210 mm.

Such an arrangement will enable the marking of the two inner faces B and C previously coated with sol gel, on which it will be possible, for example, to mark the same logo in a parallel manner with a sufficient energy level.

FIG. 1C shows, on the other hand, the positioning of the focal plane F above (or on) the upper face A of the upper wall of the bottle, which is for example located at a distance $e_3$ of 210 to 215 mm.

This arrangement will enable the simultaneous marking on the surface A by etching of the glass and on the surface B by etching of the sol gel, which will give a 3D effect on the mark logo for example.

It will furthermore be noted that if the focal plane is in the glass, there is marking in the glass.

Similarly, it is possible to use a curved lens for a curved surface (instead of a flat lens on a flat surface).

The exceptional and completely novel results obtained with the invention are illustrated in FIGS. 4 to 15' as will be explained more specifically below.

Figure 2:
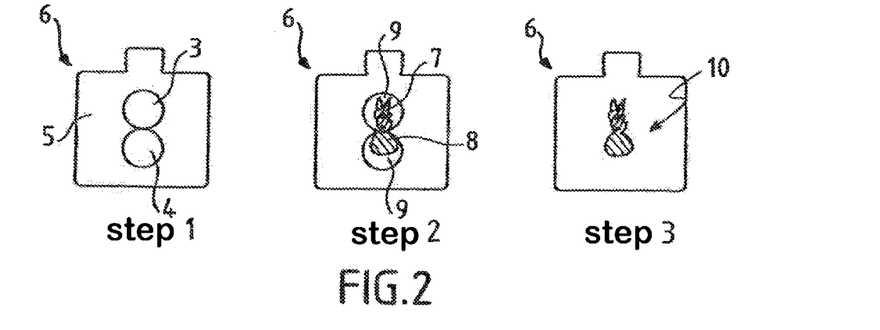
FIG. 2 schematically shows the steps of creating a multicolored pattern by juxtaposition according to one embodiment of the invention.

FIG. 2 shows the steps of another embodiment of the process according to the invention by creation of multicolor layers by juxtaposition of two spots 3 and 4 of different colors on the inner face of the wall 5 of the parallelepipedal bottle 6.

These sol-gel spots or pre-patterns (initial patterns deposited resulting, after treatment, especially laser treatment, in the final pattern(s)) are applied in a manner known per se, for example before focusing of the UV laser (step 1). Preferentially, the two applications will be dried after laser marking, which makes it possible to only carry out a single curing.

Next, marks 7 and 8 of different colors are made by UV laser marking as indicated (the light parts 9 being removed with the laser).

The result, FIG. 9, of the pattern is two-colored (cf. also below FIGS. 8 to 10).

Figure 3:
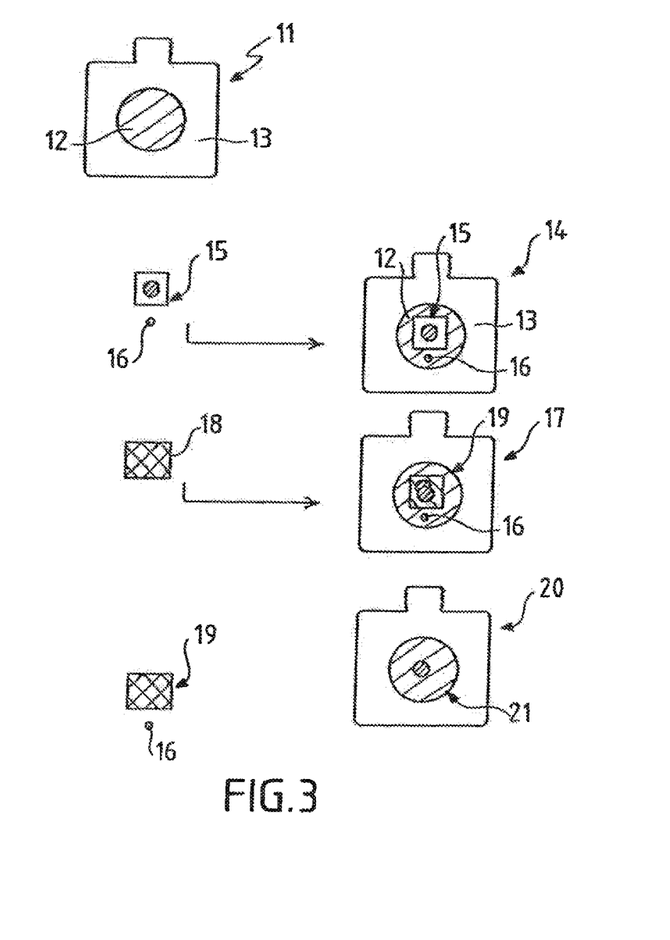
FIG. 3 schematically shows the steps of creating a multicolored pattern by superimposition according to another embodiment of the invention.

FIG. 3 schematically shows the steps of the marking process according to one embodiment of the invention by superimposing colors.

The first step 11 shows the marking, for example by spraying or stamping a spot of color 12 on the inner wall of a bottle 13.

The next step 14 consists in creating a pattern 15 with the UV laser with a positioning cross or point 16 on the spot 12 (the spot including the point).

The next step 17 consists in affixing a second color 18, for example by spraying, on the marked pattern 15 in order to obtain the superimposing of color on the pattern thus complexified 19.

Then, the laser is positioned again precisely owing to the positioning point 16 by marking a new cross or a new pattern with the laser until superimposition, then the second laser marking (step 20) is carried out in order to form the two-colored pattern 21. The result is in particular illustrated by FIGS. 5 and 8.

The creation of an interior precise pattern or lettering, having one color or having several colors, will now be described.

In this embodiment, the four surfaces may be marked simultaneously or successively in order to make 3D patterns or deep patterns.

First Step:

Application of the crude pattern(s) by spraying.

This application may be carried out in several ways.

A first way consists in using an airbrush-type nozzle enabling an inkjet or fine spraying.

The spraying/ejection takes place as follows: the object to be coated and the coating system are moved relative to one another with the aid for example of a digital machine or robot in order to affix a relatively precise pattern/zone (for example round, oval, square, rectangular, etc. spot).

The final pattern that it is desired to obtain must be inscribed within the zone deposited.

In the case of this spraying, the zones are produced for example with a vertical sweep of the deposition member (spray gun mounted on a vertical numerical axis), and a rotational positioning of the object to be coated (the object is mounted on a numerical axis of rotation).

The axis of rotation furthermore makes it possible to carry out "oscillations"/vibrations in rotation (rapid to-and-fro movements about a mean position) in order to smooth/homogenize the material deposited and prevent local overloads.

Recourse to very low rates of deposition product also makes it possible to reduce the overflows/sprays/drops outside of the zone to be coated.

Figure 4:
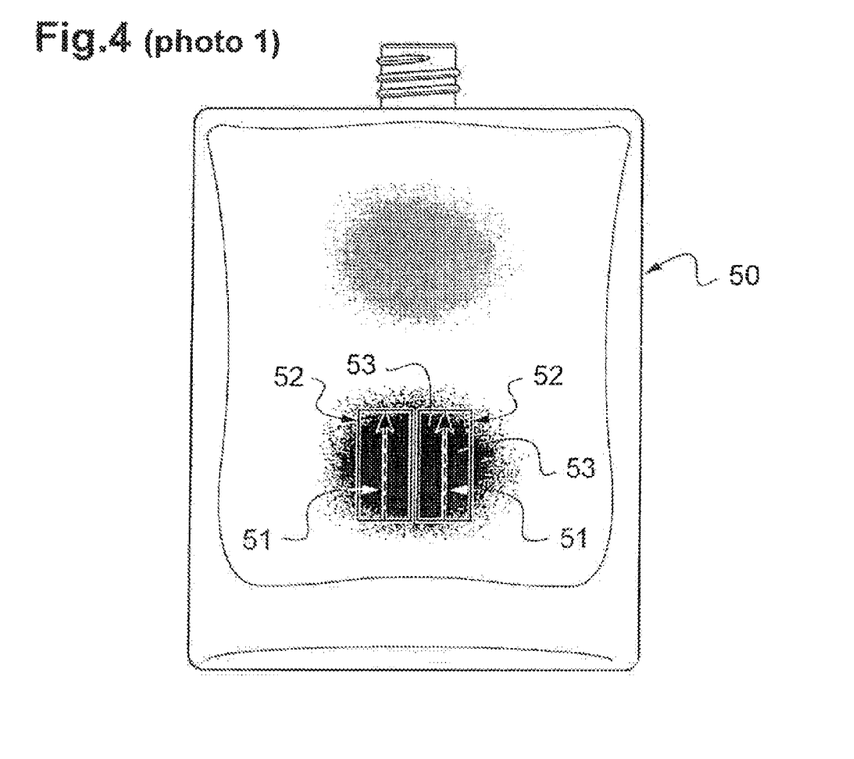
Figure 4A:
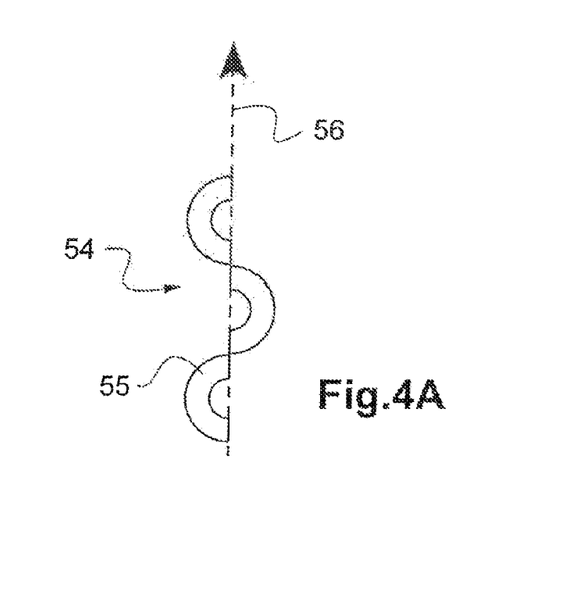

Represented in FIG. 4 (photo 1) is an example of a bottle 50 obtained with the process described above. It starts with forming a square spot (or pre-pattern).

More specifically, the rectangles 52 of dot and dash lines represent the two adjoined zones which have made it possible here to produce this square spot.

The arrows 53 represent the mean trajectory of the deposition member (here spraying member) as a result of the oscillations 54, here in rotation (cf. diagram from FIG. 4A).

The actual direction of the deposition member therefore lies over time along the "snake" 55 (the arrow 56 still representing the mean trajectory).

In order to produce a form, recourse is therefore made to:
precise displacements between the deposition member and the object to be coated,
rapid oscillations/movements between the deposition member and the object to be coated,
creation of the zone optionally as several "subzones",
the use of coating rates (in the case of spraying) that are very low (airbrush-type operation), for example 100 microliters/min. By affixing several marks of different colors and that are judiciously placed as a function of the desired final design, it is possible to produce a multicolor pattern.

With the invention in this embodiment, precise prior marking is thus obtained with internal spraying of a product that is compatible and resistant once engraved, optionally in several colors on the same pattern or on the same packaging.

The next step is that of the actual marking with a laser. For this, use is made of a UV laser with a large depth of field making it possible a) to treat a coating over a non-plane surface without changing the focusing and b) to treat several surfaces at once.

Furthermore observed with the invention are a reduction in engraving waste (less cleaning, less material used, fewer odors) and an optimized pattern creation time (compared to the time needed to engrave the entire surface).

In the embodiment more particularly described here, a 355 nm UV laser is chosen with a power of 3 W and a working depth of field without losing the high marking precision (for example±5 mm) which makes it possible to treat a surface or several surfaces n at the same time.

At this wavelength, the UV photons directly break the atomic bonds without heating and damaging the material around, which makes it possible to control the precision and to prevent damage to the glass. The UV lasers act on most of the coatings tested, unlike other types of lasers which only act on certain colors/materials.

The same is true for plastics: no heating and therefore the plastics are not damaged.

With one embodiment of the invention, provision is also made for a positioning of the laser and of patterns which is particularly effective.

In order to be able to superimpose patterns or colors, it is specifically necessary to be capable of repositioning the pattern without a locating mark, at the same location under the laser.

In order to do this and as was seen with reference to FIG. 3, the laser marks, at the same time as the pattern or design, a point or a cross positioned at a precise point (coordinates) under the pattern in the colored portion intended to be removed.

The other patterns are also located in the field of the laser by the same geometric reference.

Next, the second color is applied in the portion provided for this purpose, for example with the nozzle or spray described above, for example a blue color.

Then, using the laser and a cross or target, marking is carried out in order to position exactly on the locating mark.

A result is then obtained with a marked cross for locating the positioning before the last step.

The marking/engraving of the second color, perfectly positioned on removing the marking, is then carried out and/or repeated until the last laser pass over the last color which makes it possible to eliminate the locating mark.

Obtained in this way are (cf. FIG. 5—photo 2) an alignment and locating marks that are invisible after application, while erasing the defects of the glass or of the positioning, this being with multiple colors in a precise manner.

Represented with reference to FIGS. 6 to 15'(photos 3 to 14) are other embodiments of bottles obtained with the invention.

Figure 6:
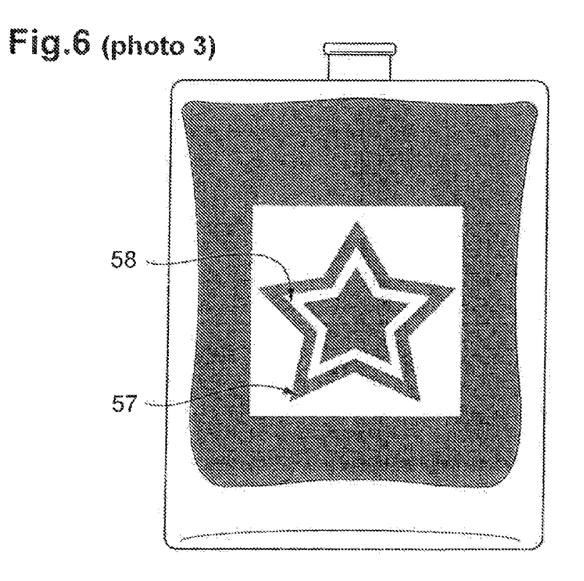

A first bottle with a local spray of color after gelling (curing) and local laser engraving around the pattern is represented in photo 3 (FIG. 6).

Here, the principle is to apply a color on an internal localized zone of the bottle by spraying using suitable programming. The engraving laser makes it possible to remove the excess material around the letters or pattern 57 that it is desired to leave as the final result.

Figure 7:
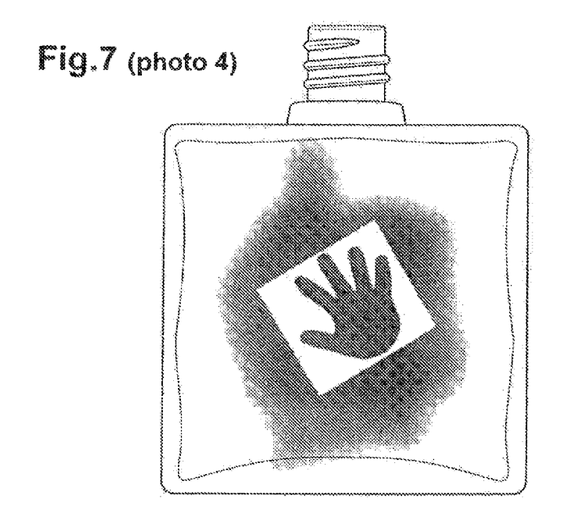

Another possibility consists in leaving a remainder 58 of the first spraying step around the laser engraving making a stencil or stamping effect (FIG. 7—photo 4).

Figure 5:
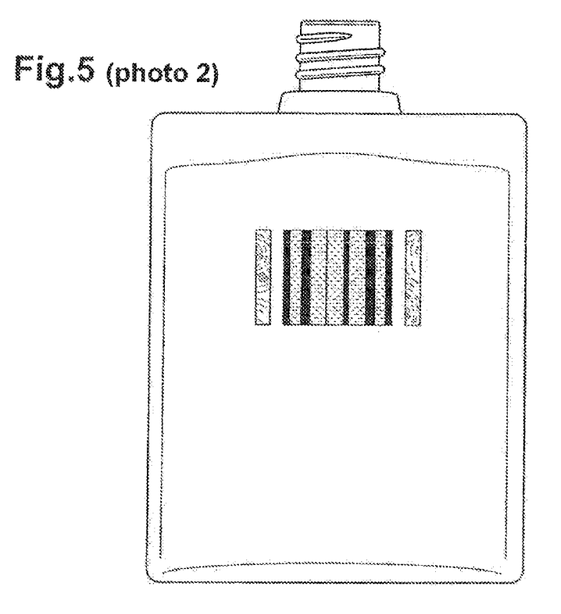
Figure 8:
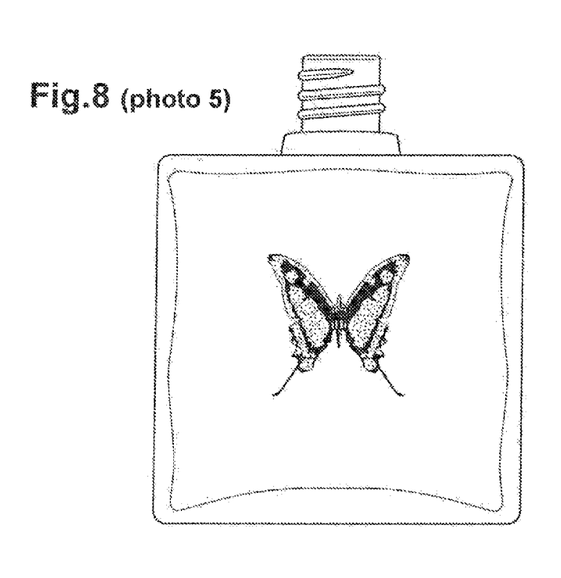
Figure 9:
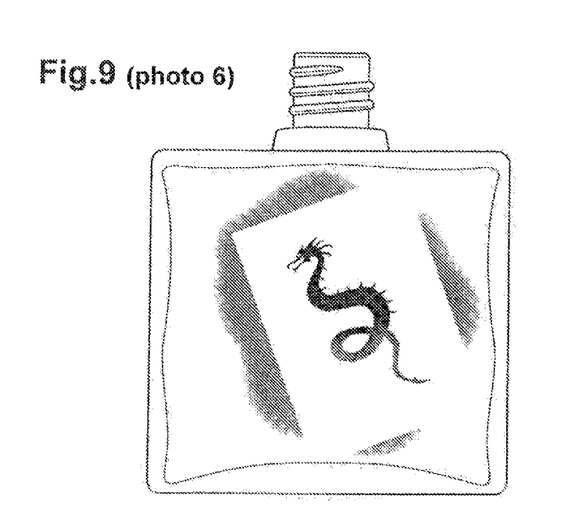
Figure 10:
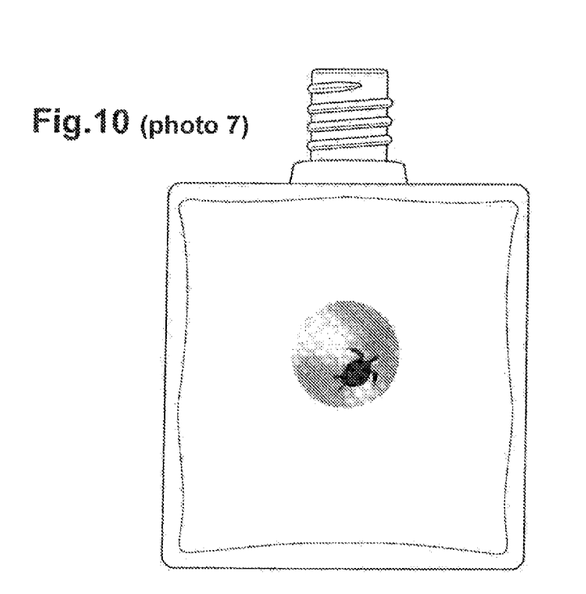

It is therefore possible to produce a simple monochrome pattern (FIG. 13) and also, as has been seen (cf. FIGS. 2 and 3), it is possible with the invention to produce several spots of color which are juxtaposed or superimposed at the start, by providing the positioning and the size of the design to be produced, and/or to produce the multicolor pattern in a single laser pass (according to the principle illustrated in FIG. 2 and an example of the result of which is represented in FIG. 9) and/or in several laser passes (according to the principle illustrated in FIG. 3, and examples of the results of which are represented in FIGS. 5, 8, and 10).

Figure 11:
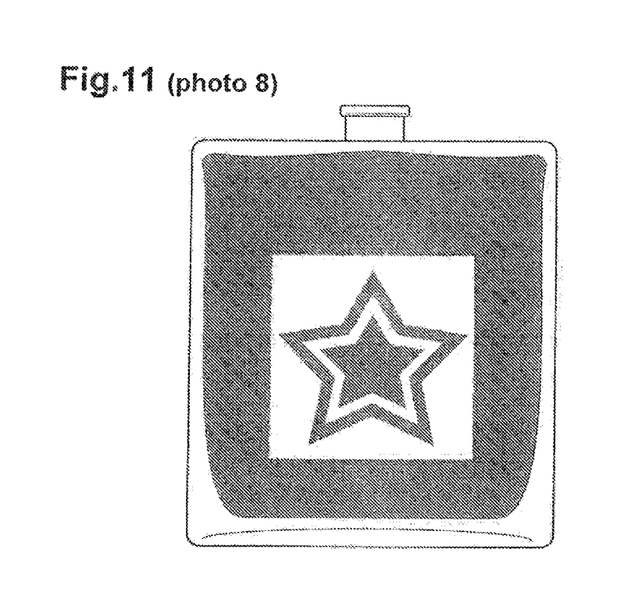

Similarly, and as indicated above, a simultaneous multi-surface marking for a 3D effect is possible (cf. FIG. 11—photo 8).

Owing to the large depth of field of the laser, it is specifically possible to mark up to four superimposed successive surfaces, namely 1 or 2 surfaces with patterns and 1 or 2 surfaces of the glass with an etching of the glass.

On the stars from photo 8 (FIG. 11), the two faces are produced separately, the glass being lightly etched at the same time as the pattern, which gives this 3D, relief appearance.

The power, the adjustment of the laser and the positioning of the bottle are also chosen in order to mark one of the surfaces of the glass in addition to marking the color pattern.

Figure 12:
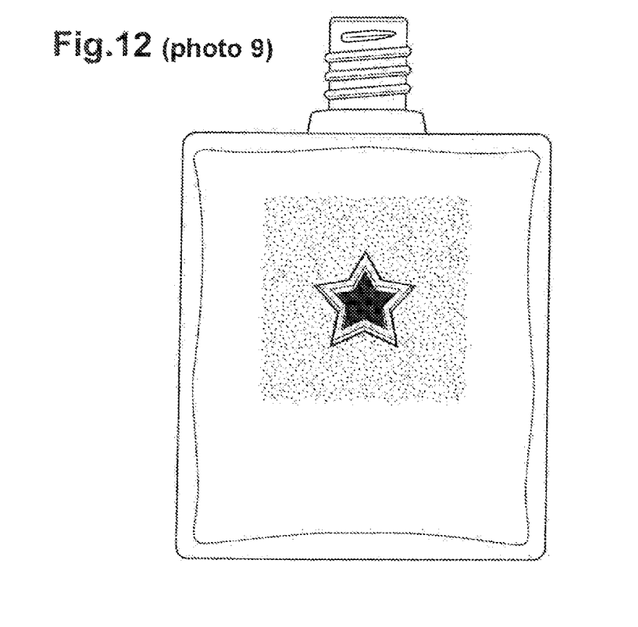
Figure 13:
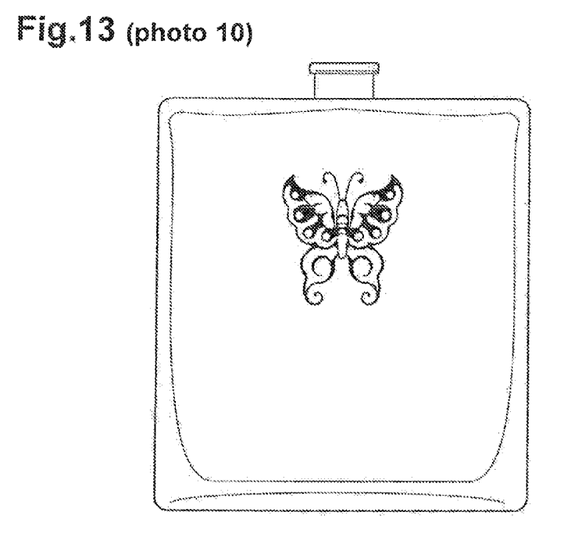

In the case corresponding to FIG. 12 (photo 9), the bottle is lowered so that the focal point is closer to the outer surface, the power of the laser is at 90%. The black star is marked on the inner surface and the glass is negatively etched on the outside.

Figure 15:
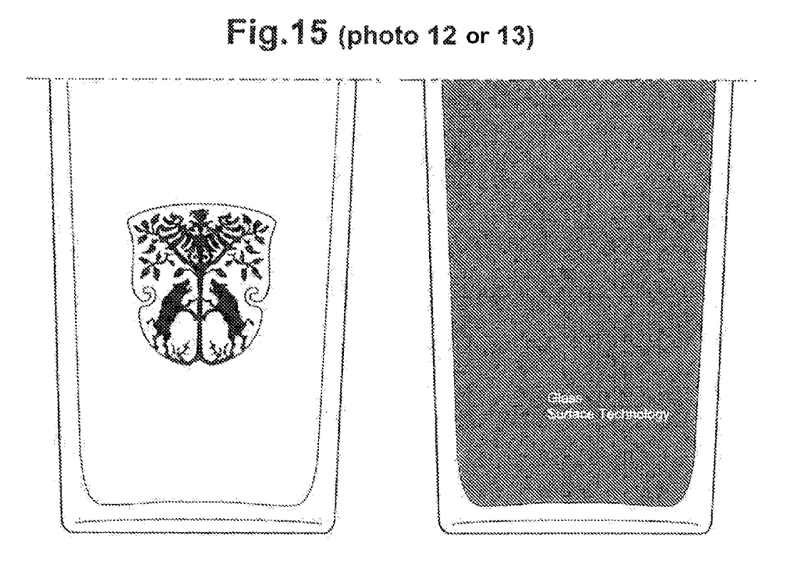

Similarly, it is possible to apply the same pattern at the same time/superimposed on several faces (dragon in the bottom right of FIG. 15—photo 14). In this case, the focal point of the laser is inside the bottle, the bottle is moved up higher. Similarly, the power of the laser is raised in order to be able to correctly engrave the two faces simultaneously.

Figure 14:
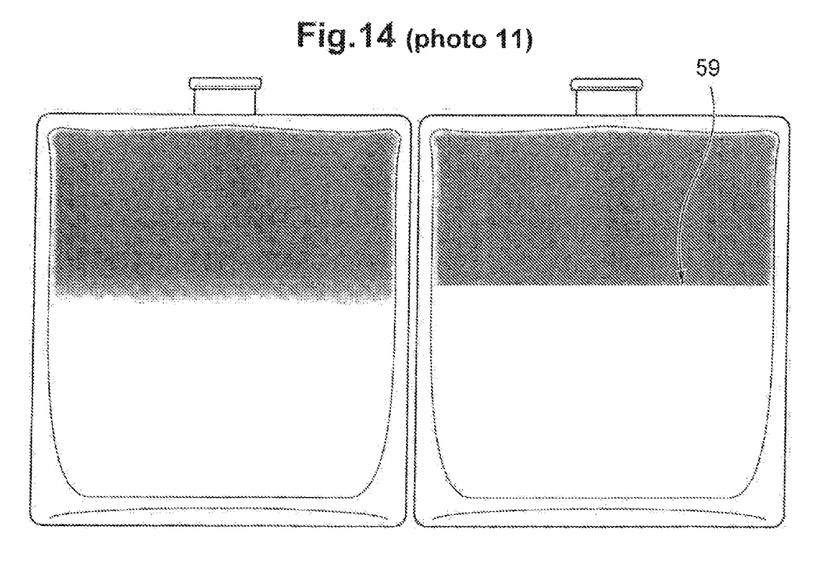

With the invention, bands of color or a sharp two-colored stop are also obtained (cf. FIG. 14—photo 11).

The laser applied at the limit of the zone of application of the spot or zone of color specifically makes it possible, astonishingly, to sharply terminate the zone stop 59.

The invention also enables a marking of the glass at the surface, in the glass or on the inner surface then a layer of color in a second step.

The objective here is to mark/etch the glass at various depths depending on the power (between 90% and 100%) and the positioning of the laser (cf. FIG. 15—photos 12 and 13).

When the inner surface is etched before the application of the sol gel, it is then possible to make use thereof as an anti-counterfeiting measure (impossible to remove the marking without the color).

With the invention, the capturing of the engraving waste is facilitated.

During the engraving, waste may specifically be generated (coating and also optionally the engraved glass).

This waste may have an odor and stick to the inner surfaces of the objects, the subsequent cleaning being laborious (simple rinsing is not sufficient to detach the waste and the odors remain persistent).

With the marking process according to the invention, it is possible, owing to a suction at the opening of the bottles, to obtain a reduction in the residual odors after engraving. There is also above all less waste to subsequently be cleaned.

One solution of adding a liquid (for example water) to the objects to be engraved also makes it possible, in one embodiment of the invention, to capture all the waste from the engraving before it sticks to the surfaces.

Once the pattern is produced, it only remains to drain the object, and optionally rinse and dry. This process also makes it possible to eliminate the odors.

It should be noted that the creation of localized spots described above makes it possible, regardless, to reduce the amount of waste to be discharged from the inside of the objects to be treated.

The invention also enables the easy addition of pigment or reactant to the sol gel developed by laser.

Here, the principle is the following: a pigment is added to the sol-gel material, the laser then makes it possible, from outside the container and through the glass, to make the pigment react locally in order to design a pattern or lettering.

For example, Merck provides a mica-based pigment which darkens with a laser. The wavelength and the type of laser are adapted to the pigment and must pass through the glass. Specifically, pigments change color by excitation with the laser (Olikrom).

Laser curing or fixation is also possible.

The laser is then used also for providing the energy for curing and fixing the colored sol gel to the surface of the glass, the excess around the pattern then being rinsed before curing.

An embodiment of a device that makes it possible to implement the invention will now be described nonlimitingly with reference to FIG. 16.

In the following, the same reference numbers will be able to be used to denote identical or similar elements.

Figure 16:
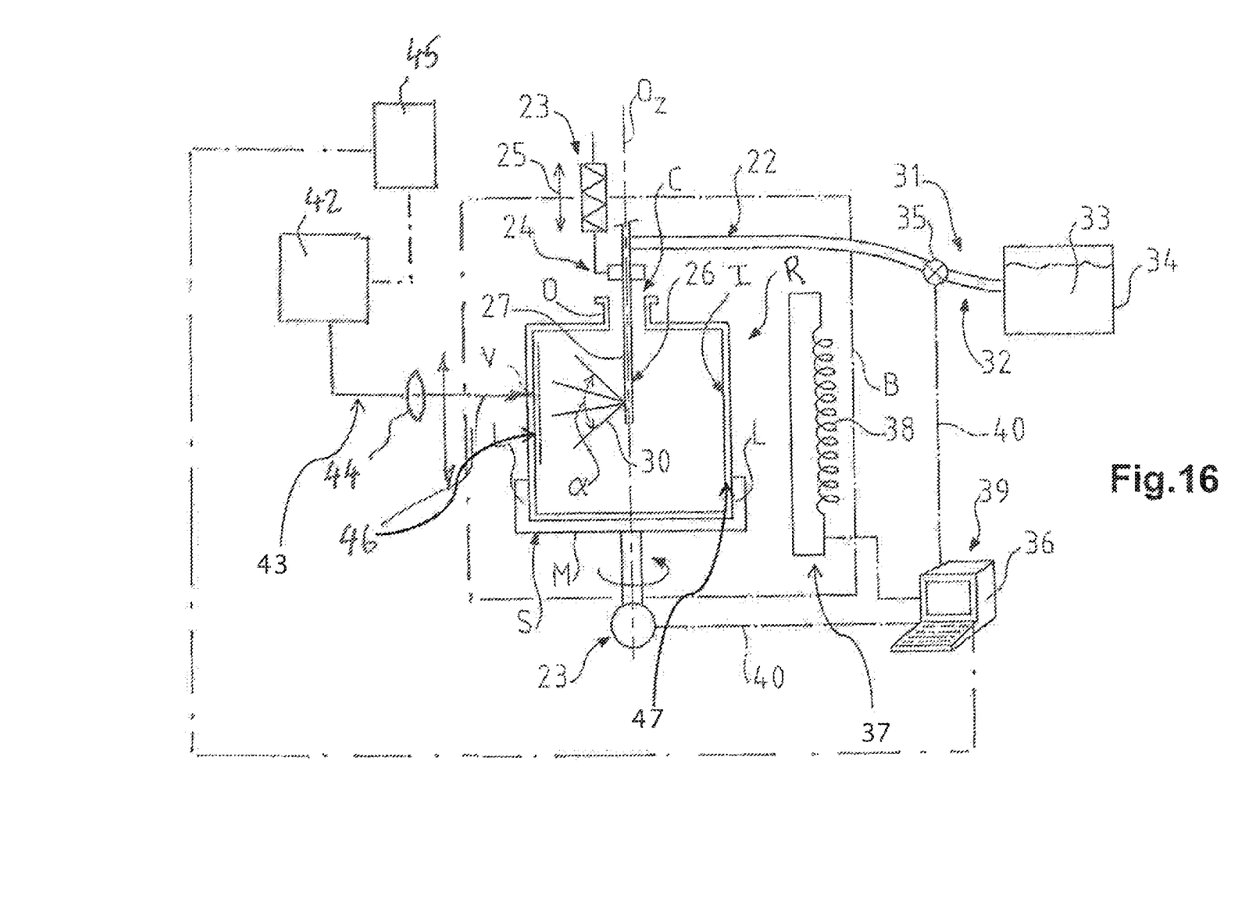
FIG. 16 is a schematic cross-sectional view of one embodiment of a marking device according to the invention.

More precisely, FIG. 16 shows a device 22 for coating V at least one portion of the inner surface I of a container R, here for example forming a parallelepipedal vial or bottle made of glass with a cylindrical neck C centered about an axis Oz. It therefore comprises, at one of its ends (top end), an opening O as a bottleneck, the opening of the bottleneck comprising the neck C with a smaller diameter than that of the container or bottle.

The container thus substantially forms a chamber.

The device comprises a support S of the container, for example comprising a dish-shaped or U-shaped retention clamp M, the arms L of which grip the base, that is to say the bottom, of the container fastened by lateral screws (not represented).

Means 23 for rotating the container about its axis Oz at a predetermined speed V are provided which are known per se. The speed V may be constant or variable and regulated. More specifically, the means comprise, for example, a rotating rod for driving the support which extends along the axis Oz and a motor for driving in a way known per se.

Means 24 for insertion/extraction (arrow 25) of a spraying tool or nozzle 26 inside the container are mounted on a frame B, as dot-and-dash lines in the figure, on the side of the bottleneck O of the container R.

The nozzle 26 comprises a longitudinal shaft or tube 27 connected, at its end 28, to the insertion means 24 comprising an actuator 23 for longitudinal displacement, such as a jack.

The action of the jack, which is integral with the nozzle 26, transfers the latter from an initial position outside the container to an operating position inside the container along the axis Oz.

It thus enables a gradual descent, continuous or stepwise, of the tool for application of the coating solution (gel in formation) to the inner surface of the container R.

The nozzle brings about vaporization 30 along a predetermined solid angle α for dispersion which depends on the ejection rate and pressure controlled in a way known per se that will enable the appearance of a coating on a precise predetermined zone.

The tube is connected, at its opposite end, to a system 31 for dispensing a liquid coating solution to be sprayed comprising means 32 for feeding the liquid or substantially liquid solution 33 in order to enable the spraying, at a predetermined flow rate D.

The system 31 thus comprises a tank 34 for storage of said liquid and means 35 for moving the liquid (metering pump) arranged in order to regulate the flow rate D of the liquid via a calculator 36 and also controls the other actuators employed in the device.

The tank comprises, in its bottom, a mixing means, for example a stirrer (not represented).

The coating gel is the curable liquid coating material obtained by the sol-gel process for example described above and that reacts with UV radiation.

The device also comprises means 37 for heating the container R that are known per se and that enable the rise in the temperature of a portion of the inner surface of the container up to a predetermined temperature threshold for drying.

More specifically, the heating of the inner surface is carried out, for example, by direct radiation using heating resistors 38 positioned outside the container or by diffusion around the wall of the container positioned in contact, for example, with a heating muffle (not represented).

But as has been seen, the heating/curing/drying may also be carried out at least partially by the laser radiation.

In one embodiment, the container and the resistor are substantially confined in one and the same chamber so as to form a furnace for homogeneous heating of the container.

The device also comprises a computer or automaton 39 for digital control comprising a calculator 36.

These are connected via a data bus 40 and in a way known per se to the actuators of the device, namely to those of the retention clamp of the container R, that is to say of the motor for driving in rotation, to those of the means 24 for insertion of the nozzle 26 into the container (jack), the stirrer, and also to those of the means 35 for moving/feeding with liquid (pump, valve, nozzle) and heating means 37 (electrical resistors).

The calculator 36 is arranged in order to calculate, from the various setpoints imposed, a law for controlling each of the actuators in a way known per se.

The device according to the invention furthermore comprises a UV laser device 42 as described above, for example, for emitting in the wavelength of 355 nm.

This device 42 comprises, in a known manner, radiation-generating means 43, a focusing lens 44 and means (for example optical means that are known per se) for distance adjustment relative to the face 46 (and/or 47) in question of the bottle for example by a servocontrolled micrometer screw also controlled by the computer 36 consequently programmed to regulate the operating parameters (distance, power, frequency, and rate of application).

As is obvious and as also results from the above, the present invention is not limited to the embodiments more particularly described. On the contrary, it encompasses all the alternative forms thereof and in particular those where the device implementing the process is different.

The application can thus and for example be carried out by lettering or stamp.

The principle here is to use a stamp in the form of a letter or pattern made of rubber (small enough to be introduced into the neck of the bottle) topped/soaked with sol gel and then introduced at the end of a shaft (automated/articulated subsequently) into the bottle before being applied to the surface of the glass. The stamp is subsequently taken out again from the bottle. The sol gel is then dried.

The invention claimed is:

1. A process for treating at least in part one inner face of a container, comprising the steps of:
    applying, by spraying or stamping, and in a marking pattern on a precise predetermined zone of said inner face, at least one pigmented sol-gel layer that reacts to UV laser radiation;
    emitting UV laser radiation with a wave length of between 255 nm and 400 nm by an optical device comprising an optic with a focal distance allowing a depth of field greater than 1 mm;
    developing said marking pattern by revealing it by interaction between the sol-gel and said UV laser radiation having a depth of field of more than 1 mm specifically programmed as a function of said marking pattern to be revealed.

2. The process as claimed in claim 1, wherein, the container being a bottle, the sol-gel layer is applied by spraying, by means of a nozzle vibrating and/or oscillating about a displacement direction of the nozzle in the bottle.

3. The process as claimed in claim 1, wherein the UV radiation is focused at a non-zero distance from said inner face to be marked.

4. The process as claimed in claim 1, wherein the optical device comprises a flat-field focusing lens.

5. The process as claimed in claim 1, wherein the applying comprises applying at least two spots of different pigmented sol-gel layer, having different colors, arranged to enable the creation of a pattern having at least two colors.

6. The process as claimed in claim 1, wherein the applying comprises successively applying several differently pigmented sol-gel layers on said precise zone to produce a superimposition of a plurality of marking patterns on one and the same face, including a first pattern, said plurality of marking patterns being revealed by interaction between said sol-gel layers and the UV laser radiation having a depth of field of more than 1 mm specifically programmed as a function of said marking patterns.

7. The process as claimed in claim 6, wherein the developing comprises developing a first marking pattern of a first sol-gel layer prior to application of a second sol-gel layer and prior to developing a second marking pattern of the second sol-gel layer, wherein the differently pigmented sol-gel layers comprise the first sol-gel layer and the second sol-gel layer, and wherein the plurality of marking patterns comprise the first marking pattern and the second marking pattern.

8. The process as claimed in claim 6, wherein each marking pattern, of the plurality of marking patterns, is located in the laser field by one and the same geometric reference marked during the marking of the first pattern.

9. The process as claimed in claim 1, wherein, the pigment of the sol-gel layer imparting thereto a specific initial coloration, the UV laser radiation is focused around the surface of the inner face at a predetermined distance in order to remove a portion of said layer so as to reveal said pattern.

10. The process as claimed in claim 1, wherein the UV laser radiation is focused around the inner face at a predetermined distance in order to cure and fix the sol gel at a location according to the desired pattern and the uncured excess around the pattern is removed.

11. The process as claimed in claim 1, wherein, the container being a bottle, the UV laser is located outside of the bottle which rotates and/or is moved horizontally and/or vertically in connection with said UV laser to expose the bottle portions intended to exhibit said pattern.

12. The process as claimed in claim 1, wherein the UV laser radiation is controlled continuously and/or discontinuously in order to selectively reveal the elements of the pattern.

13. The process as claimed in claim 1, wherein several walls of the container are marked simultaneously with one and the same UV radiation.

14. The process as claimed in claim 13, wherein at least two walls of the container are marked simultaneously, and wherein the container being a glass container, at least one of the walls of which is marked by etching of the glass and at least one other wall of which is marked by interaction between the sol-gel layer and the UV laser radiation so as to give the pattern a three-dimensional effect.

* * * * *

UNITED STATES PATENT AND TRADEMARK OFFICE
CERTIFICATE OF CORRECTION

Page 1 of 1

PATENT NO. : 11,035,042 B2
APPLICATION NO. : 16/302757
DATED : June 15, 2021
INVENTOR(S) : Wagner et al.

It is certified that error appears in the above-identified patent and that said Letters Patent is hereby corrected as shown below:

In the Claims

Column 11, Claim 1, Line 49:
After "1 mm;", insert --and--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*